March 19, 1957  M. KRAMCSAK, JR  2,785,433
INDUSTRIAL TRUCK CASTER
Original Filed Nov. 14, 1951  2 Sheets-Sheet 1
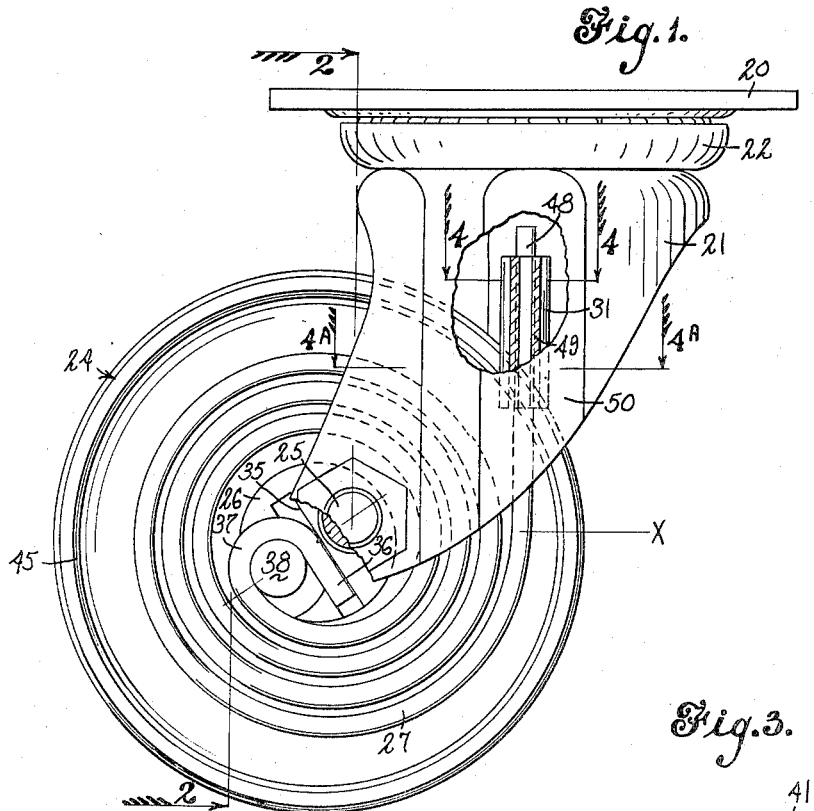
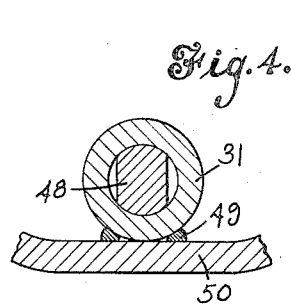
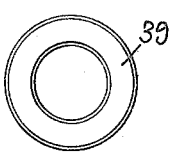
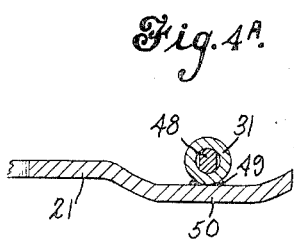
INVENTOR
M. Kramcsak, Jr.
BY Rockwell & Bartholow
ATTORNEYS March 19, 1957  M. KRAMCSAK, JR  2,785,433
INDUSTRIAL TRUCK CASTER
Original Filed Nov. 14, 1951  2 Sheets-Sheet 2
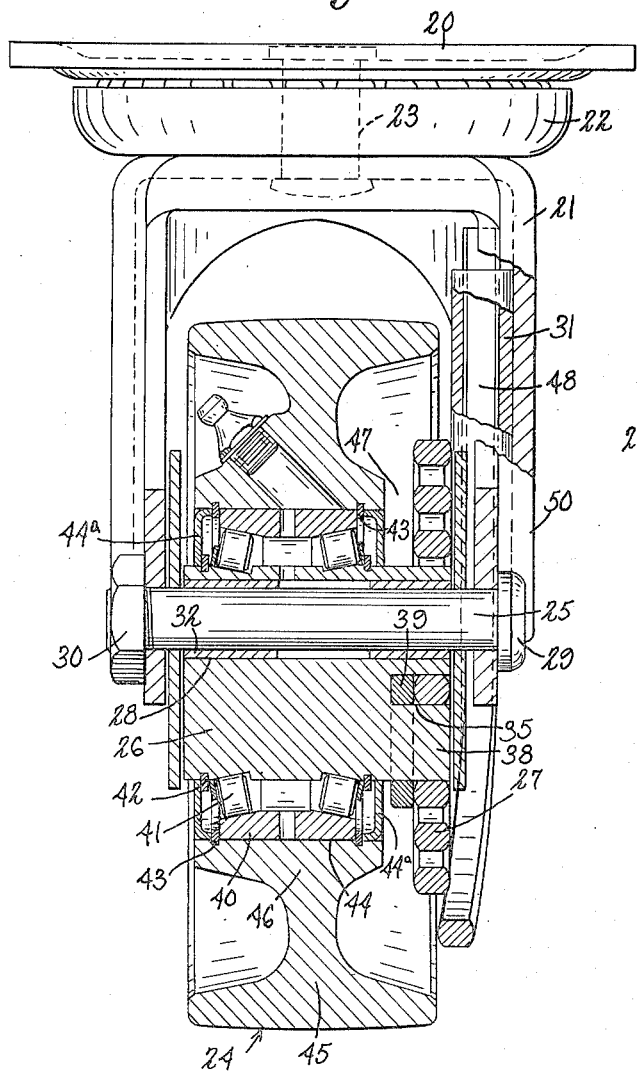
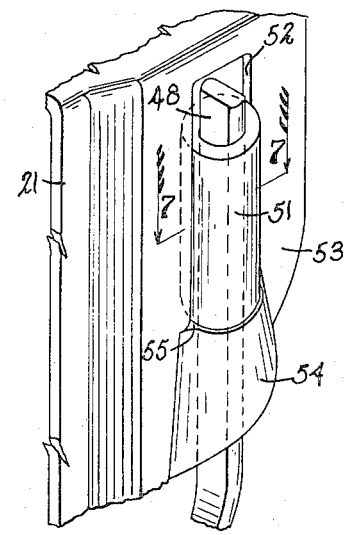
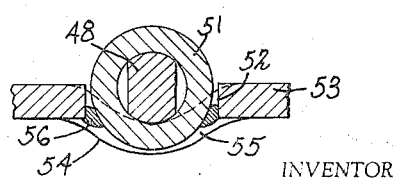
INVENTOR
M. Kramcsak, Jr.
BY Rockwell & Bartholow
ATTORNEYS

United States Patent Office 2,785,433
Patented Mar. 19, 1957

2,785,433

INDUSTRIAL TRUCK CASTER

Michael Kramcsak, Jr., Bridgeport, Conn., assignor to The Bassick Company, Bridgeport, Conn., a corporation of Connecticut Application July 12, 1955, Serial No. 521,483

4 Claims. (Cl. 16—44)

This invention relates to industrial truck casters, and more particularly to those of the type described in Herold Patents Nos. 2,377,232 and 2,544,924, dated respectively May 29, 1945, and March 13, 1951.

This application is a continuation of my application, Serial No. 256,225, filed November 14, 1951 now abandoned.

One object of the present invention is to improve and simplify casters of the general type shown in the above-mentioned patents.

Another object is to provide an improved arrangement and organization of parts in a caster wherein the skein is under the control of a single spring and where the wheel hub portion has an asymmetrical arrangement with respect to the skein.

Another object is to provide improved means whereby the position of the spring axially with respect to the skein and the wheel hub, in the assembly of the caster parts, can be controlled in a precise manner, the assembly of the spring to the skein, in the desired longitudinal position of the spring, being very easy and convenient.

Another object is to provide improved means whereby the spring can be adjusted axially with respect to the wheel hub portion.

Another purpose of the invention is to furnish a caster of the one-spring type which may be more easily and conveniently assembled than has been possible heretofore, and in which the number of parts is reduced to a minimum.

A further aim of the invention is to furnish improved means of connection between the spiral spring and the corresponding horn leg or like spring support.

In the accompanying drawings:

Fig. 1 is a side elevation with certain parts broken away of an industrial truck caster constructed in accordance with the invention;

Fig. 2 is a section on line 2—2 of Fig. 1;

Fig. 3 is a longitudinal sectional view of the skein and roller bearing assembly;

Fig. 4 is an enlarged fragmentary section on line 4—4 of Fig. 1;

Fig. 4A is a section on line 4A—4A of Fig. 1;

Fig. 5 is a detail view of the spacing member or ring against which the lower end of the spring is supported;

Fig. 6 is a fragmentary perspective view showing a modification of the connecting means between the horn leg and the upper end of the spring; and Fig. 7 is a fragmentary section on line 7—7 of Fig. 6.

The swiveling structure of the caster shown is similar to that of Herold Patent No. 2,377,232, Fig. 16, the caster being provided with an upper attaching plate adapted to be secured to the under part of the truck body or other object. The top of the caster horn has fixed thereto a cup-shaped member between which and the attaching plate antifriction balls are placed, the horn top and the attaching plate being interconnected by a swivel pin.

In the drawings, the attaching plate is indicated at 20, the horn at 21, the upwardly facing cup member fixed to the horn at 22, and the swivel pin at 23 (Fig. 2). The wheel is shown at 24, the axle at 25, and the skein at 26. The caster has a spiral spring, indicated generally at 27, the inner end of which is secured to the adjacent end of the skein and the outer end secured to the upper part of the adjacent horn leg. The specific features of these connections will be described hereinafter.

The axle 25 extends through an eccentric bore 28 in the skein, and the axle is provided at one end with a fixed head or enlargement 29, and at the opposite end with a threaded nut 30. The axle extends through holes in the horn legs near the lower extremities of the latter. The spring 27 comprises a pancake spiral portion the inner end of which is set into and interlocked with the adjacent end portion of the skein, as hereinafter described, and it also comprises a portion which is offset laterally from the body portion of the spring and continued upwardly to form an upwardly extending end portion or terminal that is fastened to the upper portion of the corresponding horn leg. The spring has a substantially straight upper end portion in a plane generally parallel to the plane of the spring body portion, and this upper end portion of the spring is fastened to the horn leg by extending it upwardly into a tubular fastening member rigidly fixed to the adjacent portion of the leg. This tubular fastening member is indicated in the drawing at 31.

The skein 26 is shown as provided within the bore 28 with suitable fixed liners 32 which engage the surface of the axle so as to provide a proper bearing for the skein in its turning movement with reference to the axle. The skein has at one end a planar face 33 to which the bore 28 extends, and a cylindrical side face 34. The connection of the lower spring end to the skein is of the kind shown in my application Serial No. 256,224, filed November 14, 1951, now Patent No. 2,721,766, dated October 25, 1955. Referring particularly to Figs. 1 and 3, it will be noted that below the bore 28 the skein face 33 is provided with a cross-groove 35 having one end leading to the side face of the skein, said groove being such that it will receive a short, straight portion 36 at the extremity of the spring. In addition to the portion 36, the spring has, as a part of a reversely turned terminal, a substantially semicircular curved portion 37. This curved portion 37 embraces a round, pinlike member 38 integral with the skein and having its free end face in the same plane as the end face 33 of the skein. The pinlike member 38 has one part of its circumference substantially coincident with the round side face of the skein, and at opposite sides of the pinlike member there are circumferential grooved portions, as described in my application above mentioned. The arrangement is such that by moving the spring in an axial direction its inner end can be engaged and interlocked with the skein end, with a portion of the innermost turn of the spring engaged with the side face of the skein, as described in the aforesaid Patent No. 2,721,766.

The pin 38 has its center in line with the diameter of the skein bore. It is to be noted that the depth of the cross-groove 35 and the depth of the grooving around the pin 38 are substantially greater than the width of the turns of the spiral spring. This provides for the accommodation around the pin 38, in close engagement therewith, of a spacing member 39 in the form of a ring, which member underlies the inner terminal portion of the spring.

As will be noted from Figs. 2 and 3, the side or face of the skein at the end opposite the spring is a plain flat face. Around the skein and nearer to the plain face than to the face 33 is an antifriction race member 40, and between this race member and the outer surface of the skein are antifriction rollers 41 arranged in two series, the axes of the rollers being at opposite inclinations to the axis of the wheel to take up end thrust as well as radial thrust. In connection with each series of rollers a retainer or spacer is employed. Each roller makes contact on the one hand with a sloping surface on the skein and on the other hand with a sloping surface on the outer race member. End snap rings 42, engaged with grooves in the skein, hold the bearing detachably in place relatively to the skein, and detachable snap rings 43 engaging the ends of the outer race and grooves in the hub portion of the wheel position the bearing relatively to the wheel. The wheel hub portion has a bore 44 the diameter of which is such that the hub portion closely fits the external surface of the outer race member. End plates 44ª cover the bearing and are substantially flush with the side faces of the wheel hub.

As shown particularly in Fig. 2, the wheel rim 45 is symmetrically placed with respect to the skein, but on the other hand the hub portion, indicated at 46, is located asymmetrically with respect to the skein. The left-hand end of the wheel hub (Fig. 2) is in a plane close to that of the adjacent end of the skein, but the right-hand end is spaced at a substantial distance from the corresponding end of the skein so that, when the spring is placed in position, there is a substantial space 47 between the hub portion of the wheel (and its associated bearing structure) and the opposing portion of the body part of the spring. The distance between this wheel hub portion and the spring body is controlled by the lateral dimension or depth of the ring 39. If a shallower ring or spacer than that shown in Fig. 2 were employed, the spring would be closer to the wheel hub, and if a deeper ring were employed the spring would be spaced at a greater distance. It is of advantage to have the spring spaced from the wheel hub at a substantial distance so that in the winding and unwinding of the spring in the operation of the device the spring turns and the wheel hub will not come into contact or undesirable proximity to each other.

The straight upper end portion of the spring 27 engaging the tubular fastening member 31 is indicated at 48. This portion is located in a plane parallel to and inwardly of the plane of the adjacent horn leg, and in this form the tube serving as a fastener is welded to the inner face of the horn leg by a weld 49. This weld, as shown in Fig. 4, is between the inner face of the horn leg and the round external face of the tubular socket member and extends throughout the length of the tube. The part of the horn leg to which the tube is fastened is an outwardly displaced panel portion 50 extending from the lower inclined edge of the leg substantially to the top of the leg.

With reference to Fig. 1, it is noted that from the inner extremity of the spiral spring the turns take a counter-clockwise direction as the distance from a given center increases and that the largest turn has its greatest diameter or dimension below the center. It is also to be noted that this turn, at what is substantially its lowermost point, is slightly offset from the plane in which the greater part of the body portion of the spring is disposed. From this lowermost point this turn, as it approaches the offset plane in which the tube 31 is disposed, has a very gradual deviation or offset to about the point marked X, which is at about the level of the center of the spiral. At about this point X, which is substantially in the vertical plane of the tube, the turn of the spring merges very gradually with the straight and vertical portion that is in line with the tube axis. The gradual offsetting of the outermost turn commences at a point that is about in line horizontally with the point X.

In assembling the parts of the caster it is preferred, as a first step, to form the subassembly of the skein and the bearing supported and carried thereby, shown in Fig. 3. Thereafter the spring 27 is applied to the skein in order to interlock the inner terminal with the skein, this being done after the placing of the spacing member 39 around pin 38. The assembly can then be introduced into the lower end of the horn (the axle having not yet been placed in position), and can be lifted to move the assembly upwardly. In this operation, the upper extension of the spring passes into the lower end of the tube 31. When the upper extension reaches the position in which it is to be secured in place, it extends upwardly somewhat beyond the upper end of the tube, and a part of the extension extends downwardly from the lower end of the tube. The axle 25 may then be placed in position to hold the upper end of the spring in place and complete the assembly.

By the construction described, the upper part of the spring can be very readily placed in position and secured in a manner such that the outer end of the spring will be firmly held in place. The assembly is very much quicker and more convenient than in previous devices of this general class. Disassemblage of the caster can also be accomplished very quickly and easily because, after removal of the axle, the spring end can be freed from the leg by giving the spring a downward pull or push to disengage it from the socket member.

It is also to be noted that, in addition to the ease of assembly, the construction has the merit that the form of the spring as described is simple and easy to produce. Moreover, the spacing member 39 not only serves as a means for spacing the wheel hub from the spring body, as described, but also, by having a portion projecting beyond the side surface of the skein (Fig. 2) provides a substantial abutment and side support for a portion of the spring which would otherwise be unsupported. Another advantage of this construction is that, if in some cases it is desired to use a spring having wider turns in the body portion, this can be done by omitting the spacing member or providing a spacing member of less width.

An important advantage of the specific form and arrangement of the spring, as above described, is that interference of the spring with the wheel is inhibited and the wheel can be of smaller or different dimensions than would otherwise be the case. In encountering a bump the wheel will move upwardly from the position shown in Fig. 1 without corresponding upward movement of the outermost turn of the spring and under ordinary conditions there would be a tendency toward the wheel contacting the spring and interfering with the operation. However, with the present construction the lower part of the outermost spring turn is offset (Fig. 2) so as to avoid or remedy this. Thus there is permitted the employment of a wheel of smaller dimension in diameter and/or greater rim width than would otherwise obtain. A further advantage over a structure employing a sharp angular offset in the spring at a predetermined point is that the present spring is better adapted to assembly with any of a number of casters varying from each other in specific form and/or dimensions.

In Figs. 6 and 7 there is shown a modified form of the connection between the upper end of the spring and the horn leg. Here a tube 51 is employed which is similar to the tube 31. However, in this case the tube is received in a slotted portion provided in the horn leg. The horn leg is provided with an upwardly directed elongated slot 52 in an outwardly bulged or offset panel portion 53, this slot being located immediately above an integral outwardly bowed portion 54 of the horn leg. This portion 54 is somewhat wider at the bottom than at the top, as shown in Fig. 6. The lower edge of the portion 54 is a part of the downwardly sloped lower edge of the horn leg. The upper edge 55 of portion 54 defines the slot 52 at the lower end of the latter, although the edge 55 is slightly offset in an outward direction from the plane of the panel portion 53. The edge 55 additionally serves to seat the lower end of the tube 51. The weld between the tube and the horn leg is between the side edges of the slot 52 and adjacent portions of the tube, there being two weld portions, indicated at 56 in Fig. 7. In this form the axis of the tube is only slightly offset inwardly with respect to the plane of the adjacent horn leg portion, but obviously modification may be made in this as well as other respects. The tube is shown here as of a round cross section, but if desired it may be of a somewhat flattened cross section. In the form of Figs. 6 and 7, the lower end of the tube rests on the shelf-like portion 54, but preferably the upper end of the tube is spaced downwardly from the upper end of the slot, as shown in Fig. 6, to enable access to be had to the upwardly protruding end portion of the spring. In the first described form also, the upper end of the spring protrudes somewhat from the tube, as for disassembling the spring it is desirable to have access to the spring end with a suitable tool so that, if necessary, downward pressure can be brought against the spring end. It is apparent from Fig. 2 that a tool used for prying the spring end in a downward direction can be introduced between the spring end and the upper or connecting part of the horn.

It is understood that in the structure herein described the antifriction bearing is detachably secured in fixed axial relationship to the skein and forms therewith the subassembly shown in Fig. 3, the wheel member, when assembled with the subassembly, being detachably mounted in axially fixed relationship to the subassembly. Thus axial adjustment of the wheel member of the assembly can if desired be effected by axial adjustment of the skein.

Various other modifications may be made without departure from the principles of the invention and the scope of the claims.

What I claim is:

1. In a caster, the combination of a wheel, an axle, a horn having legs supporting the axle and from which the axle is withdrawable by a lengthwise movement, a skein mounted on the axle for turning on an axis eccentric to the skein and about which the wheel is revoluble, an upright tubular member fixed to one of said horn legs and open at the upper and lower ends, and a spring having a terminal attached to said horn leg by said tubular member and another terminal attached to said skein at the same side of the wheel, said spring having a pancake spiral body with an inner end fastened to the end of the skein, said spiral body having an outermost turn which in a region below the center of the spiral is gradually drawn from the plane of the spiral body to an offset plane, said turn at about the level of the spiral center and in said offset plane merging with a straight vertical end portion received in and extending through said tubular member, said spring end portion being held in place in the assembly by said axle.

2. A caster as defined in claim 1, in which said upright tubular member is welded to the inner face of the supporting horn leg, the lower extremity of the upright tubular member being above a lower inclined edge of the horn leg.

3. A caster as defined in claim 1, in which said upright tubular member is positioned within an upright elongated slot formed in the horn leg, the horn leg having at its outer face an integral laterally projecting shelflike portion defining the lower end of the slot and upon which the lower end of the upright tubular member is supported.

4. In a caster, the combination of a wheel, an axle, a horn having legs supporting the axle and from which the axle is withdrawable by a lengthwise movement, a skein mounted on the axle for turning on an axis eccentric to the skein and about which the wheel is revoluble, an upright sleevelike member open at the upper and lower ends and fixed to one of said horn legs so that the lower end is at an elevation substantially above the axle, and a spring having one end connected to said horn leg by said sleevelike member and the other end connected to said skein at the same side of the wheel, said spring having a pancake spiral body whose inner end is fastened to the skein, said spiral body having an outermost turn which commencing at a level substantially at the center of the spiral is gradually drawn from the plane of the spiral body to a point at about the level of the spiral center at the opposite side of the spring where the turn is completely offset from the plane of said body, said spring at approximately said last-mentioned point merging with a straight vertical end portion or extension extending through and upwardly beyond said sleevelike member, a part of said spring extension being located below said sleevelike member, and said spring extension being held in place in the assembly by said axle.

References Cited in the file of this patent
UNITED STATES PATENTS

| | | |
|---|---|---|
| 270,635 | Castor | Jan. 16, 1883 |
| 412,645 | Minard | Oct. 8, 1889 |
| 1,169,652 | Kimberley | Jan. 25, 1916 |
| 1,225,113 | Davie | May 8, 1917 |
| 2,377,232 | Herold | May 29, 1945 |
| 2,443,900 | Evans | June 22, 1948 |
| 2,506,278 | Ristow | May 2, 1950 |
| 2,544,924 | Herold | Mar. 13, 1951 |